US012753713B2

(12) United States Patent
Mitarai et al.

(10) Patent No.: US 12,753,713 B2
(45) Date of Patent: Oct. 6, 2026

(54) ENGINE DEVICE

(71) Applicant: Yanmar Holdings Co., Ltd., Osaka (JP)

(72) Inventors: Kenta Mitarai, Osaka (JP); Ken Kawabe, Osaka (JP)

(73) Assignee: YANMAR HOLDINGS CO., LTD., Osaka (JP)

(*) Notice: Subject to any disclaimer, the term of this patent is extended or adjusted under 35 U.S.C. 154(b) by 0 days.

(21) Appl. No.: 19/080,763

(22) Filed: Mar. 14, 2025

(65) Prior Publication Data

US 2025/0290438 A1 Sep. 18, 2025

(30) Foreign Application Priority Data

Mar. 18, 2024 (JP) ................................ 2024-042191

(51) Int. Cl.

*F01N 3/20* (2006.01)
*F02D 19/06* (2006.01)
*F02D 41/00* (2006.01)

(52) U.S. Cl.

CPC .......... *F01N 3/2053* (2013.01); *F01N 3/208* (2013.01); *F01N 3/206* (2013.01); *F01N 2610/02* (2013.01); *F01N 2900/1616* (2013.01); *F02D 19/0644* (2013.01); *F02D 41/0025* (2013.01)

(58) Field of Classification Search

CPC combination set(s) only.
See application file for complete search history.

(56) References Cited

U.S. PATENT DOCUMENTS 6,173,568 B1 * 1/2001 Zurbig ................ F01N 13/0097 60/274
10,641,153 B1 * 5/2020 Harris ..................... F01N 3/021
10,895,188 B2 1/2021 Kobayashi et al.
(Continued)

FOREIGN PATENT DOCUMENTS

JP 2010-121509 A 6/2010
JP 2020-090894 A 6/2020

OTHER PUBLICATIONS

The extended European search report dated Jun. 13, 2025, issued in EP Application No. 25159720.9.

*Primary Examiner* — Binh Q Tran
(74) *Attorney, Agent, or Firm* — NORTON ROSE FULBRIGHT US LLP

(57) ABSTRACT

An engine device is an engine device comprising an engine which is operated by a fuel containing at least ammonia, and comprises: an exhaust passage through which the exhaust gas exhausted from the engine is flowed in the exhaust direction; a selective reduction catalyst which is provided in the exhaust passage and reduces nitrogen oxides contained in the exhaust gas by a reducing agent; an ammonia adsorption catalyst which is provided in the exhaust passage on the upper stream side than the selective reduction catalyst in the exhaust direction, and adsorbs ammonia contained in the exhaust gas; a first bypass passage which is connected to the exhaust passage to bypass the ammonia adsorption catalyst; and a first path switch valve which is provided on the upper stream side than the ammonia adsorption catalyst in the exhaust direction and switches whether the flow of the exhaust gas is passed through the ammonia adsorption catalyst or not.

10 Claims, 2 Drawing Sheets

(56) References Cited

U.S. PATENT DOCUMENTS

| | | | | |
|---|---|---|---|---|
| 2006/0213187 | A1* | 9/2006 | Kupe | F01N 3/035 60/286 |
| 2011/0265455 | A1* | 11/2011 | Hirota | F02D 19/0644 60/285 |
| 2015/0023854 | A1* | 1/2015 | Lim | B01D 53/9477 423/212 |
| 2015/0238903 | A1* | 8/2015 | Mital | F01N 9/00 422/111 |
| 2016/0169074 | A1* | 6/2016 | Clayton, Jr. | F01N 3/2013 60/287 |
| 2020/0240308 | A1* | 7/2020 | Barbier | F01N 3/208 |
| 2023/0193803 | A1 | 6/2023 | Svraka et al. | |

* cited by examiner

ENGINE DEVICE

CROSS-REFERENCE TO RELATED APPLICATION

This application claims priority under 35 U.S.C. § 119 to Japanese Application No. 2024-042191, filed on Mar. 18, 2024, the entire contents of which are hereby incorporated by reference.

TECHNICAL FIELD

The present invention relates to an engine device comprising an engine which is operated by a fuel containing at least ammonia.

BACKGROUND ART

Conventionally, in engine devices, there is the type of engine device comprising an engine which is operated by a fuel containing at least ammonia such as an ammonia mono-fuel combustion engine which is operated by ammonia as a sole fuel, and an ammonia mixed fuel combustion engine which is operated by ammonia and hydrogen and/or a hydrocarbon-based fuel such as light oil. In the exhaust gas exhausted from such an engine, unburned ammonia and nitrogen oxides (NOx) may be contained, and it is required for the engine device to exhaust the exhaust gas after unburned ammonia and nitrogen oxides therein are purified.

For example, in Patent Document 1, an exhaust gas purification device which purifies the exhaust gas in an internal combustion engine which is fueled by ammonia comprises: a catalyst having a function to reduce nitrogen oxides and a function to oxidize ammonia; an adsorbent material which is arranged on the lower stream side of the catalyst and adsorbs ammonia in the exhaust gas; an active state detection part detecting an active state of the catalyst; a concentration acquisition part acquiring the concentration of the exhaust gas on the lower stream side of the adsorbent material; and a control part controlling the amount of ammonia supplied by a fuel supply part of supplying ammonia to the internal combustion engine. When the catalyst is in the active state, the control part controls the amount of supplied ammonia by using the concentration of the exhaust gas acquired from the concentration acquisition part so that the concentration of the exhaust gas on the lower stream side of the adsorbent material is kept constant.

In addition, in Patent Document 2, an ammonia engine system is an ammonia engine system comprising: an ammonia engine which is fueled by ammonia; and an ammonia cracker device which includes an ammonia cracker catalyst of cracking ammonia, and cracks ammonia to generate hydrogen, wherein an ammonia oxidation device is provided between the ammonia engine and the ammonia cracker device.

PRIOR ART DOCUMENT

Patent Document

Patent Document 1: Japanese Patent Laid-Open No. 2020-90894

Patent Document 2: Japanese Patent Laid-Open No. 2010-121509

SUMMARY OF INVENTION

Technical Problem

However, for the conventional engine device as in Patent Document 1, while it can purify the exhaust gas by reducing nitrogen oxides in the exhaust gas with a catalyst and by oxidizing ammonia, it does not control the amount and ratio of nitrogen oxides and ammonia in the exhaust gas. Because of this, it is necessary to construct an exhaust gas purification device on the basis of the estimated maximum value of nitrogen oxides and ammonia in the exhaust gas, and therefore the capacity and size of the exhaust gas purification device may be increased.

Moreover, for the conventional engine device as in Patent Document 2, ammonia is mixed and combusted with hydrogen to improve incombustibility of ammonia; however, to improve deteriorated exhaust gas properties resulting from that combustion and to purify the exhaust gas are not considered.

The present invention aims at providing an engine device which facilitates making a device compact, and which can maintain good exhaust gas properties, inhibit the amount of the used reducing agent and purify the exhaust gas.

Solution to Problem

In order to solve the above problems, an engine device of the present invention is an engine device comprising an engine which is operated by a fuel containing at least ammonia, comprising: an exhaust passage through which an exhaust gas is exhausted from the engine in an exhaust direction; in the exhaust passage, a selective reduction catalyst which reduces nitrogen oxides contained in the exhaust gas by a reducing agent; in the exhaust passage on an upper stream side than the selective reduction catalyst in the exhaust direction, an ammonia adsorption catalyst which adsorbs ammonia contained in the exhaust gas; a first bypass passage connected to the exhaust passage to bypass the ammonia adsorption catalyst; and a first path switch valve which switches whether a flow of the exhaust gas is to pass through the ammonia adsorption catalyst or not.

Advantageous Effects of Invention

According to the present invention, provided is an engine device which facilitates making a device compact, and which can maintain good exhaust gas properties, inhibit the amount of the used reducing agent and purify the exhaust gas.

DESCRIPTION OF EMBODIMENTS

Figure 1:
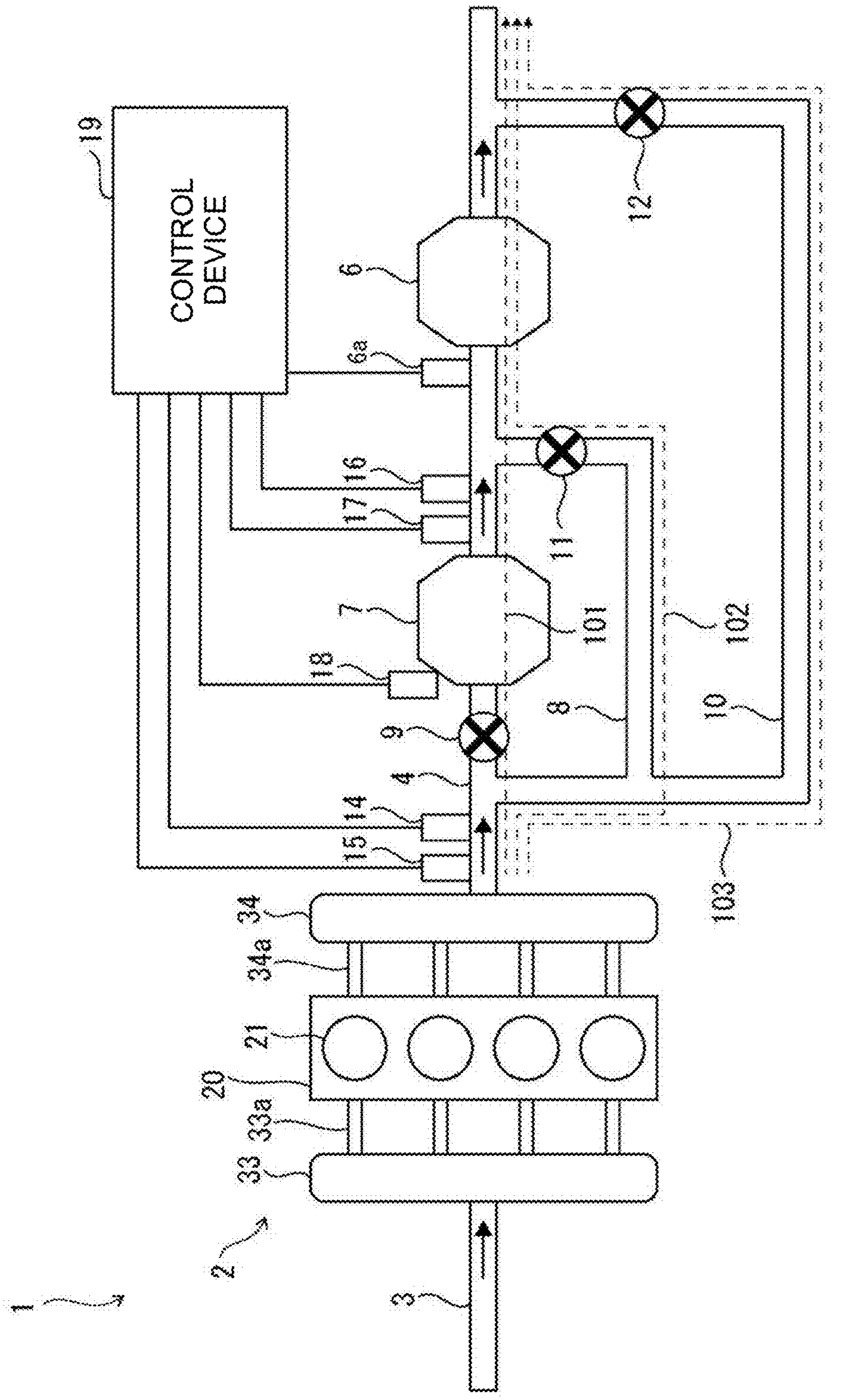
FIG. 1 is a schematic view illustrating an example of an engine device according to an embodiment of the present invention.

An engine device 1 of an embodiment of the present invention will be explained with reference to the drawings. As shown in FIG. 1, the engine device 1 comprises an engine 2, an intake passage 3 and an exhaust passage 4. Also, the engine device 1 comprises a selective reduction catalyst 6, an ammonia adsorption catalyst 7, a first bypass passage 8, a first path switch valve 9, a second bypass passage 10, a second path switch valve 11 and a third path switch valve 12. Further, the engine device 1 comprises a first ammonia detection part 14, a first nitrogen oxides detection part 15, a second ammonia detection part 16, a second nitrogen oxides detection part 17, a temperature detection part 18 and a control device 19.

In the present embodiment, especially, the engine 2 is the type of engine that is operated by a fuel containing at least ammonia such as an ammonia mono-fuel combustion engine which is operated by ammonia as a sole fuel, or an ammonia mixed fuel combustion engine which is operated by ammonia and hydrogen and/or a hydrocarbon-based fuel such as light oil. An air-fuel mixture of ammonia and air is supplied to and combusted in a combustion chamber 21*a* of each cylinder 21 of the engine 2.

Figure 2:
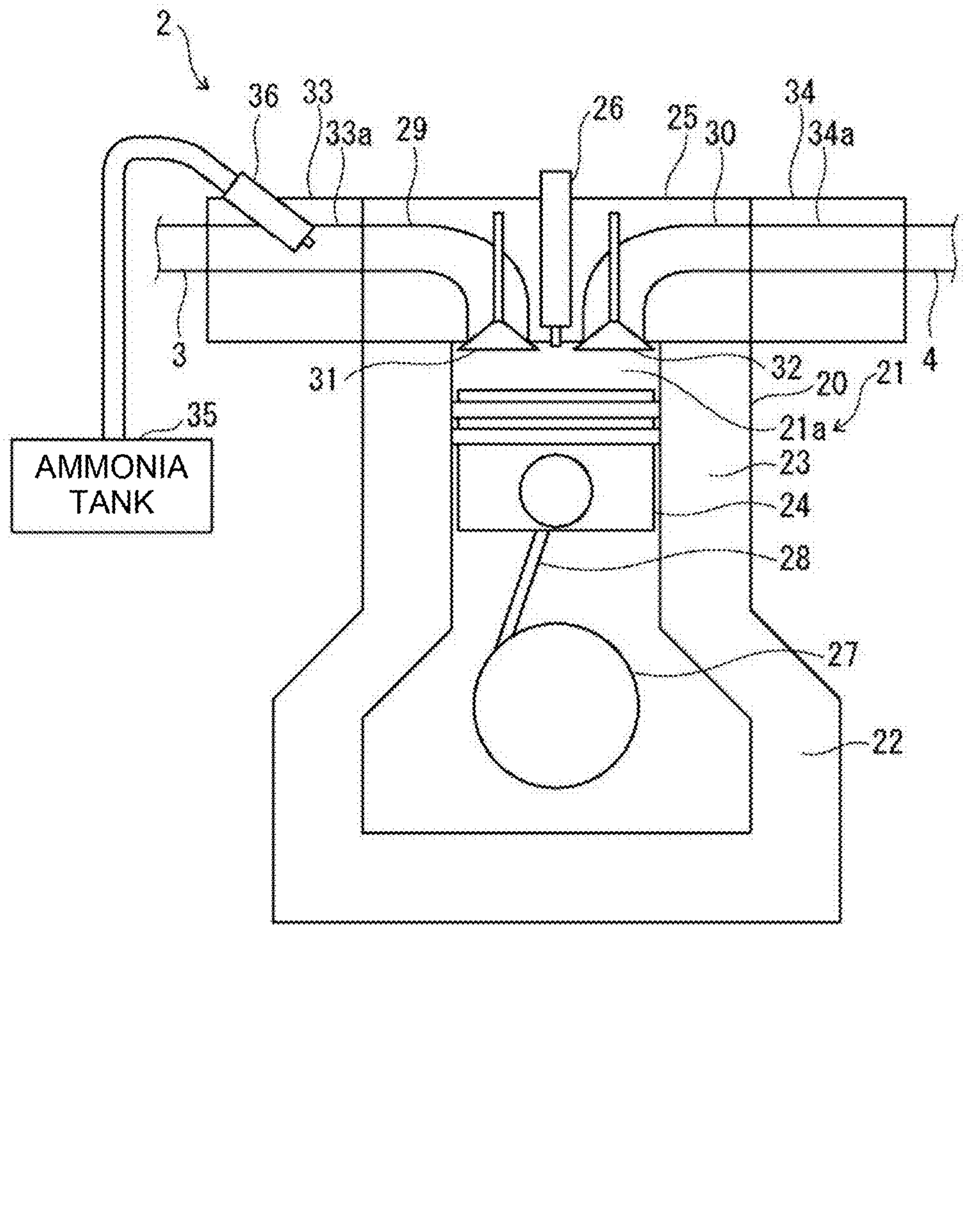
FIG. 2 is a schematic view illustrating an example of part of an engine in the engine device according to the embodiment of the present invention.

The engine 2 is, for example, a four-stroke cycle engine which is composed by comprising a plurality of cylinders 21 in a cylinder block 20 and a crankcase 22 (see FIG. 2). In FIG. 1, although four cylinders 21 are shown, the number of cylinders 21 is not limited to four. As shown in FIG. 2, the cylinder 21 is composed of a cylinder body 23, a piston 24 and a cylinder head 25.

The cylinder body 23 is cylindrically formed in the cylinder block 20, for example, and the piston 24 is slidably contained in the cylinder body 23. The cylinder head 25 is attached to the upper side of the cylinder body 23, and forms the combustion chamber 21*a* on the inner sides of the cylinder body 23 and the cylinder head 25. In the cylinder head 25, an ignition device 26 which ignites the fuel in the combustion chamber 21*a* is provided.

Each cylinder body 23 of the plurality of cylinders 21 communicates with the crankcase 22, and a crankshaft 27 is rotatably supported by a shaft to the crankcase 22. The piston 24 of each cylinder 21 is coupled to the crankshaft 27 via a connecting rod 28, and the reciprocating motion of the piston 24 is converted to the rotary motion of the crankshaft 27 via the connecting rod 28.

The cylinder head 25 has an intake port 29 and an exhaust port 30 which communicate with the combustion chamber 21*a* of the cylinder body 23, and comprises an intake valve 31 and an exhaust valve 32 which respectively open and close the intake port 29 and the exhaust port 30 with respect to the combustion chamber 21*a*.

The intake port 29 is connected to the intake passage 3 to introduce air supplied form the intake passage 3 to the combustion chamber 21*a*, and the exhaust port 30 is connected to the exhaust passage 4 to exhaust the exhaust gas generated in the combustion chamber 21*a* to the exhaust passage 4. While when the intake valve 31 is opened, the air-fuel mixture of fuel gas and air can be taken to the combustion chamber 21*a* via the intake port 29, when the exhaust valve 32 is opened, the exhaust gas generated in the combustion chamber 21*a* can be exhausted via the exhaust port 30.

The intake passage 3 is connected to the plurality of cylinders 21 of the engine 2 to supply compressed and cooled air to each cylinder 21. The air-fuel mixture of air supplied from the intake passage 3 and ammonia supplied from an ammonia tank 35 is supplied from the intake passage 3 to the combustion chamber 21*a* of each cylinder 21. For example, the intake passage 3 is connected to the engine 2 via an intake manifold 33. The intake manifold 33 has branch channels 33*a* which branch to the plurality of cylinders 21, and each branch channel 33*a* is connected to each intake port 29.

Meanwhile, in the intake passage 3, the branch channel 33*a*, the intake port 29 or the cylinder head 25, a fuel supply part 36 is provided to supply ammonia from the ammonia tank 35 toward each combustion chamber 21*a*. In the fuel supply part 36, the amount of supplied ammonia (supply pressure), the supply timing and the like are controlled by the control device 19. The fuel supply part 36 may be composed of a venturi mixer in which air flowing through the intake passage 3 is mixed with ammonia, or alternatively, may be composed of an admission valve, an injector and the like provided so as to correspond to each combustion chamber 21*a* for injecting ammonia.

The exhaust passage 4 is connected to the plurality of cylinders 21 of the engine 2 to flow and exhaust the exhaust gas generated in each cylinder 21 therethrough. For example, the exhaust passage 4 is connected to the engine 2 via an exhaust manifold 34. The exhaust manifold 34 has branch channels 34*a* which branch into the plurality of cylinders 21, and each branch channel 34*a* is connected to each exhaust port 30.

On the lower stream side of the exhaust direction, the exhaust passage 4 is connected to the selective reduction catalyst 6 and the ammonia adsorption catalyst 7 to treat the exhaust gas flowing through the exhaust passage 4. The selective reduction catalyst 6 and the ammonia adsorption catalyst 7 are arranged through the exhaust passage 4 in series.

The selective reduction catalyst 6 is provided in the exhaust passage 4 to purify ammonia and nitrogen oxides in the exhaust gas by selectively reducing nitrogen oxides contained in the exhaust gas flowing through the exhaust passage 4 with a reducing agent such as urea water. In the exhaust direction, on the upper stream side than the selective reduction catalyst 6, a reducing agent supply part 6*a* is provided in the exhaust passage 4 to supply the reducing agent toward the selective reduction catalyst 6. In the reducing agent supply part 6*a*, the amount of the supplied reducing agent is controlled by the control device 19.

For example, the selective reduction catalyst 6 serves to react and reduce ammonia and nitrogen oxides in a one-to-one ratio (proportion) of the concentration or the number of moles; the reducing agent supply part 6*a* is controlled by the control device 19 and supplies the reducing agent so as to achieve the one-to-one concentration or number of moles of ammonia and nitrogen oxides introduced to the selective reduction catalyst 6 along with the exhaust gas.

The ammonia adsorption catalyst 7 is provided in the exhaust passage 4 on the upper stream side than the selective reduction catalyst 6 in the exhaust direction, and purifies ammonia in the exhaust gas by adsorbing ammonia contained in the exhaust gas which flows through the exhaust passage 4. In other words, by adsorbing ammonia, the ammonia adsorption catalyst 7 reduces the concentration and/or the number of moles of ammonia introduced to the selective reduction catalyst 6 due to the exhaust gas.

For example, the ammonia adsorption catalyst 7 may be composed of activated carbon, zeolites, prussian blue, MOF (referred to as porous metal complex), or PCP (referred to as porous coordination polymer) and the like as an ammonia-adsorbing material. Alternatively, in addition to the function to adsorb ammonia, the ammonia adsorption catalyst 7 may be composed of Fe ion-exchange zeolites, Cu ion-exchange zeolites and the like as a material which also reacts with nitrogen oxides.

Meanwhile, in a case where ammonia is adsorbed to the ammonia adsorption catalyst 7, the ammonia adsorption catalyst 7 is configured to desorb ammonia from the ammonia adsorption catalyst 7 by wind power of the exhaust gas or the reaction with nitrogen oxides when the exhaust gas is passed through the ammonia adsorption catalyst 7. At this time, the ammonia adsorption catalyst 7 may be capable of desorbing ammonia at a certain desorption temperature or more.

The first bypass passage 8 is connected to the exhaust passage 4 so as to bypass the ammonia adsorption catalyst 7. That is to say, in the exhaust direction, the first bypass passage 8 is connected to the exhaust passage 4 on the upper stream side than the ammonia adsorption catalyst 7, on the lower stream side than the ammonia adsorption catalyst 7, and on the upper stream side than the selective reduction catalyst 6. Meanwhile, it is beneficial for the exhaust passage 4 to have a check valve and the like to prevent the back-flow from the first bypass passage 8 to the exhaust passage 4 on the upper stream side of the exhaust direction than the confluence of the exhaust passage 4 and the outlet of the first bypass passage 8. Further, it is beneficial for the first bypass passage 8 to have a check valve and the like to prevent the back-flow from the exhaust passage 4 to the first bypass passage 8 on the upper stream side of the exhaust direction than the confluence of the exhaust passage 4 and the outlet of the first bypass passage 8.

The first path switch valve 9 is provided in the exhaust passage 4 on the upper stream side than the ammonia adsorption catalyst 7 in the exhaust direction, and serves to switch whether the flow of the exhaust gas passes through the ammonia adsorption catalyst 7 or not. In other words, given that a path in which the exhaust gas exhausted from the engine 2 is flowed solely through the exhaust passage 4 and is passed and exhausted through the ammonia adsorption catalyst 7 and the selective reduction catalyst 6 is defined as a main exhaust path 101, the first path switch valve 9 switches whether the flow of the exhaust gas through the main exhaust path 101 is allowed or not. The first path switch valve 9 is controlled by the control device 19 to switch it between the open state and the closed state, and when it is in the open state, the flow of the exhaust gas through the main exhaust path 101 is allowed while when it is in the closed state, the flow of the exhaust gas through the main exhaust path 101 is not allowed.

The second bypass passage 10 is connected to the exhaust passage 4 so as to bypass the ammonia adsorption catalyst 7 and the selective reduction catalyst 6. To be more specific, the second bypass passage 10 is connected to the exhaust passage 4 on the upper stream side than the ammonia adsorption catalyst 7 and on the lower stream side than the selective reduction catalyst 6 in the exhaust direction. Meanwhile, it is beneficial for the exhaust passage 4 to have a check valve and the like to prevent the back-flow from the second bypass passage 10 to the exhaust passage 4 on the upper stream side of the exhaust direction than the confluence of the exhaust passage 4 and the outlet of the second bypass passage 10. Meanwhile, it is beneficial for the second bypass passage 10 to have a check valve and the like to prevent the back-flow from the exhaust passage 4 to the second bypass passage 10 on the upper stream side of the exhaust direction than the confluence of the exhaust passage 4 and the outlet of the second bypass passage 10.

The second path switch valve 11 is provided in the first bypass passage 8 on the upper stream side than the selective reduction catalyst 6 in the exhaust direction, and serves to switch whether the flow of the exhaust gas passes through the selective reduction catalyst 6 or not. In other words, given that a path in which the exhaust gas exhausted from the engine 2 is flowed through the exhaust passage 4 and the first bypass passage 8 and is passed and exhausted through the selective reduction catalyst 6 without being passed through the ammonia adsorption catalyst 7 is defined as a first bypass path 102, the second path switch valve 11 switches whether the flow of the exhaust gas through the first bypass path 102 is allowed or not. The second path switch valve 11 is controlled by the control device 19 to switch it between the open state and the closed state, and when it is in the open state, the flow of the exhaust gas through the first bypass path 102 is allowed while when it is in the closed state, the flow of the exhaust gas through the first bypass path 102 is not allowed.

The third path switch valve 12 is provided in the second bypass passage 10, and serves to switch whether the exhaust gas is flowed therethrough with the ammonia adsorption catalyst 7 and the selective reduction catalyst 6 being bypassed. Put another way, given that a path in which the exhaust gas exhausted from the engine 2 is flowed and exhausted through the exhaust passage 4 and the second bypass passage 10 without being passed through the ammonia adsorption catalyst 7 and the selective reduction catalyst 6 is defined as a second bypass path 103, the third path switch valve 12 switches whether the flow of the exhaust gas through the second bypass path 103 is allowed or not. The third path switch valve 12 is controlled by the control device 19 to switch it between the open state or the closed state, and when it is in the open state, the flow of the exhaust gas through the second bypass path 103 is allowed while when it is in the closed state, the flow of the exhaust gas through the second bypass path 103 is not allowed.

In an example shown in FIG. 1, in a case where the first path switch valve 9 is turned to the open state, and at the same time, the second path switch valve 11 and the third path switch valve 12 are turned to the closed state, the exhaust gas is flowed and exhausted through the main exhaust path 101. In addition, in a case where the second path switch valve 11 is turned to the open state, and at the same time, the first path switch valve 9 and the third path switch valve 12 are turned to the closed state, the exhaust gas is flowed and exhausted through the first bypass path 102. Also, in a case where the third path switch valve 12 is turned to the open state, and at the same time, the first path switch valve 9 and the second path switch valve 11 are turned to the closed state, the exhaust gas is flowed and exhausted through the second bypass path 103.

The first ammonia detection part 14 is provided in the exhaust passage 4 on the upper stream side of the exhaust direction than the ammonia adsorption catalyst 7, and in particular, on the upper stream side of the exhaust direction than the branch point of the exhaust passage 4 and the inlet of the first bypass passage 8, and serves to detect unburned ammonia contained in the exhaust gas flowing through the exhaust passage 4. For example, the first ammonia detection part 14 serves to detect the amount of emissions and concentration of ammonia contained in the exhaust gas, and can calculate the number of moles of ammonia contained in the exhaust gas based on the detection results.

The first nitrogen oxides detection part 15 is provided in the exhaust passage 4 on the upper stream side of the exhaust direction than the ammonia adsorption catalyst 7, and in particular, on the upper stream side of the exhaust direction than the branch point of the exhaust passage 4 and the inlet of the first bypass passage 8, and serves to detect nitrogen oxides contained in the exhaust gas flowing through the exhaust passage 4. For example, the first nitrogen oxides detection part 15 serves to detect the amount of emissions and concentration of nitrogen oxides contained in the exhaust gas, and moreover, can calculate the number of moles of nitrogen oxides contained in the exhaust gas based on the detection results.

Meanwhile, although in FIG. 1, an example that in the exhaust passage 4, the first nitrogen oxides detection part 15 is arranged on the upper stream side of the exhaust direction than the first ammonia detection part 14 has been shown, the present invention is not limited to this example; alternatively, the first ammonia detection part 14 may be arranged on the upper stream side of the exhaust direction than the first nitrogen oxides detection part 15. In the present embodiment, although an example that the first ammonia detection part 14 and the first nitrogen oxides detection part 15 are structured as separate devices and sensors has been explained, the present invention is not limited to this example; alternatively, the first ammonia detection part 14 and the first nitrogen oxides detection part 15 may be structured with an integral device and sensor.

The second ammonia detection part 16 is provided in the exhaust passage 4 on the lower stream side of the exhaust direction than the ammonia adsorption catalyst 7 and on the upper stream side than the selective reduction catalyst 6, in particular, is provided on the upper stream side of the exhaust direction than the confluence of the exhaust passage 4 and the outlet of the first bypass passage 8, and serves to detect unburned ammonia contained in the exhaust gas flowing through the exhaust passage 4. For example, the second ammonia detection part 16 serves to detect the amount of emissions and concentration of ammonia contained in the exhaust gas, and moreover, can calculate the number of moles of ammonia contained in the exhaust gas based on the detection results.

The second nitrogen oxides detection part 17 is provided in the exhaust passage 4 on the lower stream side of the exhaust direction than the ammonia adsorption catalyst 7 and on the upper stream side than the selective reduction catalyst 6, in particular, on the upper stream side of the exhaust direction than the confluence of the exhaust passage 4 and the outlet of the first bypass passage 8, and serves to detect nitrogen oxides contained in the exhaust gas flowing through the exhaust passage 4. For example, the second nitrogen oxides detection part 17 serves to detect the amount of emissions and concentration of nitrogen oxides contained in the exhaust gas, and moreover, can calculate the number of moles of nitrogen oxides contained in the exhaust gas based on the detection results.

Meanwhile, although in FIG. 1, an example that in the exhaust passage 4, the second nitrogen oxides detection part 17 is arranged on the upper stream side of the exhaust direction than the second ammonia detection part 16 has been shown, the present invention is not limited to this example; alternatively, the second ammonia detection part 16 may be arranged on the upper stream side of the exhaust direction than the second nitrogen oxides detection part 17. In the present embodiment, although an example that the second ammonia detection part 16 and the second nitrogen oxides detection part 17 are structured as separate devices or sensors has been explained, the present invention is not limited to this example; alternatively, the second ammonia detection part 16 and the second nitrogen oxides detection part 17 may be structured with an integral device or sensor.

The temperature detection part 18 serves to detect the temperature of the exhaust gas exhausted from the engine 2 and/or the temperature of the ammonia adsorption catalyst 7. For example, the temperature detection part 18 is provided in the exhaust passage 4 on the upper stream side of the exhaust direction than the ammonia adsorption catalyst 7, in particular, on the lower stream side of the exhaust direction than the branch point of the exhaust passage 4 and the inlet of the first bypass passage 8, and detects the temperature of the exhaust gas introduced from the exhaust passage 4 to the ammonia adsorption catalyst 7. Alternatively, the temperature detection part 18 is provided in the vicinity of the ammonia adsorption catalyst 7 or in contact with the ammonia adsorption catalyst 7, and detects the temperature of the ammonia adsorption catalyst 7.

The control device 19 is a computer such as an ECU (Engine Control Unit) to control the operation of the engine 2, comprises CPU, ROM, RAM, etc., and is configured to control the respective parts of the engine 2. The control device 19 may be configured to store various programs for controlling the engine 2, and read and execute the programs to control the engine 2.

For example, based on the detection results from the second ammonia detection part 16 and the second nitrogen oxides detection part 17, the control device 19 controls the reducing agent supply part 6*a* so as to achieve a predetermined (for example, one-to-one) ratio of the concentration, the number of moles or the like of ammonia and nitrogen oxides introduced to the selective reduction catalyst 6 along with the exhaust gas, and controls an amount of the supplied reducing agent which is supplied to the selective reduction catalyst 6.

Further, based on the ratio of the concentration, the number of moles or the like of unburned ammonia and the ratio of the concentration, the number of moles or the like of nitrogen oxides in the exhaust gas exhausted from the engine 2, the control device 19 decides whether the exhaust gas is flowed through the ammonia adsorption catalyst 7 and the selective reduction catalyst 6 or not. Preferably, in addition to the ratio of unburned ammonia and the ratio of nitrogen oxides, the control device 19 decides whether the exhaust gas is flowed through the ammonia adsorption catalyst 7 and the selective reduction catalyst 6 or not, based on the amount of ammonia adsorbed in the ammonia adsorption catalyst 7. Based on the decision results, the control device 19 controls the operation of the first path switch valve 9, and preferably, in addition to the first path switch valve 9, controls the operation of the second path switch valve 11 and the third path switch valve 12 to control the flow of the exhaust gas.

Here, the control device 19 acquires the ratio of unburned ammonia and the ratio of nitrogen oxides in the exhaust gas on the upper stream side of the exhaust direction than the ammonia adsorption catalyst 7, and in particular, on the upper stream side of the exhaust direction than the branch point of the exhaust passage 4 and the inlet of the first bypass passage 8 in the exhaust passage 4. For example, the control device 19 acquires the ratio of ammonia and the ratio of nitrogen oxides based on the detection results from the first ammonia detection part 14 and the detection results from the first nitrogen oxides detection part 15.

Moreover, the control device 19 calculates or estimates the amount of ammonia adsorbed in the ammonia adsorption catalyst 7 based on the temperature of the exhaust gas and/or the temperature of the ammonia adsorption catalyst 7. For example, the control device 19 monitors the concentration of unburned ammonia and the concentration of nitrogen oxides per unit time in the exhaust gas introduced to the ammonia adsorption catalyst 7 based on the detection results from the first ammonia detection part 14 and the detection results from the first nitrogen oxides detection part 15. The control device 19 acquires the amount of adsorbed ammonia by utilizing a model which calculates the amount of ammonia adsorbed in the ammonia adsorption catalyst 7 based on the temperature of the exhaust gas and/or the temperature of the ammonia adsorption catalyst 7, the concentration of ammonia, and the concentration of nitrogen oxides.

Moreover, based on the ratio of ammonia and the ratio of nitrogen oxides detected in the first ammonia detection part 14 and the first nitrogen oxides detection part 15, the control device 19 controls a path through which the exhaust gas is flowed to switch the path to any one of the main exhaust path 101, the first bypass path 102 and the second bypass path 103 described above. Preferably, in addition to the ratio of ammonia and the ratio of nitrogen oxides, the control device 19 controls the operation of the first path switch valve 9 based on the amount of ammonia adsorbed in the ammonia adsorption catalyst 7, and preferably, in addition to the first path switch valve 9, it controls the operation of the second path switch valve 11 and the third path switch valve 12 to switch the path through which the exhaust gas is flowed.

For example, when the ratio of ammonia is higher than the ratio of nitrogen oxides in the exhaust gas, or when the ratio of nitrogen oxides is higher than the ratio of ammonia in the exhaust gas and the amount of ammonia adsorbed in the ammonia adsorption catalyst 7 is higher than a predetermined threshold of amount adsorbed, the control device 19 turns the first path switch valve 9 to the open state and turns the second path switch valve 11 and the third path switch valve 12 to the closed state to switch the path to the main exhaust path 101 to exhaust the exhaust gas through the ammonia adsorption catalyst 7 and the selective reduction catalyst 6.

Moreover, when the ratio of nitrogen oxides is higher than the ratio of ammonia in the exhaust gas and the amount of ammonia adsorbed in the ammonia adsorption catalyst 7 is less than a predetermined threshold of amount adsorbed, the control device 19 turns the second path switch valve 11 to the open state and turns the first path switch valve 9 and the third path switch valve 12 to the closed state to switch the path to the first bypass path 102 to pass and exhaust the exhaust gas through the selective reduction catalyst 6 without being passed through the ammonia adsorption catalyst 7.

Further, regardless of the ratio of nitrogen oxides and the ratio of ammonia in the exhaust gas, in the event that abnormalities occurs to the operational state of the engine 2 or the selective reduction catalyst 6, the control device 19 turns the third path switch valve 12 to the open state and turns the first path switch valve 9 and the second path switch valve 11 to the closed state to switch the path to the second bypass path 103 to exhaust the exhaust gas without being passed through the ammonia adsorption catalyst 7 and the selective reduction catalyst 6.

For example, the control device 19 may decide that abnormalities occur to the operational state of the engine 2 in the event that parameters (such as load, fuel injection pressure, fuel injection timing, air excess ratio, for example) set for supplying ammonia to the engine 2 deviate from a range of the safe area. It may decide that abnormalities occur to the selective reduction catalyst 6 in the event that a predetermined amount of ammonia and nitrogen oxides or more is detected by sensors which detect ammonia and nitrogen oxides on the lower stream side of the exhaust direction than the selective reduction catalyst 6.

As described above, according to this embodiment, the engine device 1 is the engine device 1 comprising the engine 2 which is operated by a fuel containing at least ammonia, and comprises: the exhaust passage 4 through which the exhaust gas exhausted from the engine 2 is flowed in the exhaust direction; in the exhaust passage, the selective reduction catalyst 6 which reduces nitrogen oxides contained in the exhaust gas by a reducing agent; in the exhaust passage 4 on the upper stream side than the selective reduction catalyst 6 in the exhaust direction, the ammonia adsorption catalyst 7 which adsorbs ammonia contained in the exhaust gas; the first bypass passage 8 which is connected to the exhaust passage 4 to bypass the ammonia adsorption catalyst 7; and the first path switch valve 9 which switches whether the flow of the exhaust gas passes through the ammonia adsorption catalyst 7 or not. For example, the first path switch valve 9 is provided on the upper stream side than the ammonia adsorption catalyst 7 in the exhaust direction.

As a result of this, the engine device 1 facilitates making a device compact, and simultaneously, can maintain good exhaust gas properties, inhibit the amount of the used reducing agent, and purify the exhaust gas. For example, while the engine device 1 can flow the exhaust gas containing reduced ammonia through the lower stream side by adsorbing redundant ammonia in the exhaust gas at the ammonia adsorption catalyst 7, it can introduce and purify the exhaust gas whose appropriate ratio of ammonia/nitrogen oxides is achieved at the selective reduction catalyst 6 on the lower stream side.

In addition, because the engine device 1 blows ammonia adsorbed at the ammonia adsorption catalyst 7 with the exhaust gas to flow it through the lower stream side to use as a source of purifying nitrogen oxides instead of removing ammonia by oxidation, an amount of the supplied reducing agent required for the selective reduction catalyst 6 can be inhibited and the reducing agent can be saved, which can improve efficiency of purifying ammonia and nitrogen oxides. Therefore, it is not necessary to treat all of ammonia in the exhaust gas at the ammonia adsorption catalyst 7, and the ammonia adsorption catalyst 7 can be made compact.

Moreover, the engine device 1 exhausts the exhaust gas by bypassing the ammonia adsorption catalyst 7 by means of the first bypass passage 8, which also restricts usage of the ammonia adsorption catalyst 7 and allows prolongation of life; in the selective reduction catalyst 6 on the lower stream side, ammonia and nitrogen oxides can be purified by supplying a reducing agent so that an appropriate ratio of ammonia/nitrogen oxides introduced with the exhaust gas is achieved.

Thus, because ammonia and nitrogen oxides in the exhaust gas are purified at an appropriate ratio in the selective reduction catalyst 6, the engine device 1 can not only control combustion of the engine 2 and control a supplied reducing agent, but can also optimize the ratio of ammonia and nitrogen oxides introduced to the selective reduction catalyst 6 by utilizing the ammonia adsorption catalyst 7 in some cases. For this reason, it is necessary for the engine device 1 to control the combustion of the engine 2 only, and it is not necessary to control the ratio of ammonia and nitrogen oxides in the exhaust gas exhausted from the engine 2 at a certain range, allowing the engine 2 to be driven with importance being placed on fuel economy.

In addition, according to this embodiment, the engine device 1 further comprises: the second bypass passage 10 connected to the exhaust passage 4 to bypass the ammonia adsorption catalyst 7 and the selective reduction catalyst 6; and the second path switch valve 11 switching whether the flow of the exhaust gas passes through the selective reduction catalyst 6 or not. For example, the second path switch valve 11 is provided on the upper stream side than the selective reduction catalyst 6 in the exhaust direction.

Thanks to this, the engine device 1 exhausts the exhaust gas while the ammonia adsorption catalyst 7 and the selective reduction catalyst 6 are bypassed by the second bypass passage 10, which restricts usage of the ammonia adsorption catalyst 7 and the selective reduction catalyst 6 and allows prolongation of life. Further, in the event that abnormalities occurs to the engine 2 (abnormalities in the exhaust gas) or abnormalities occurs to the ammonia adsorption catalyst 7 and the selective reduction catalyst 6, damage to the ammonia adsorption catalyst 7 and the selective reduction catalyst 6 resulting from introduction of the exhaust gas can be inhibited.

Moreover, according to this embodiment, the engine device 1 further comprises, in the exhaust passage 4 on the upper stream side than the ammonia adsorption catalyst 7 in the exhaust direction, the first ammonia detection part 14 detecting ammonia contained in the exhaust gas and the first nitrogen oxides detection part 15 detecting nitrogen oxides contained in the exhaust gas, and controls the operation of the first path switch valve 9 based on the detection results from the first ammonia detection part 14 and the first nitrogen oxides detection part 15.

In this way, the engine device 1 can selectively switch a path through which the exhaust gas is flowed by means of a simplified structure utilizing the first ammonia detection part 14, the first nitrogen oxides detection part 15 and the first path switch valve 9.

In addition, according to this embodiment, the engine device 1 further comprises, in the exhaust passage 4 on the lower stream side than the ammonia adsorption catalyst 7 and on the upper stream side than the selective reduction catalyst 6 in the exhaust direction, the second ammonia detection part 16 detecting ammonia contained in the exhaust gas and the second nitrogen oxides detection part 17 detecting nitrogen oxides contained in the exhaust gas.

By virtue of this, the engine device 1 can determine the amount of the supplied reducing agent supplied to the selective reduction catalyst 6 by means of a simplified structure utilizing the second ammonia detection part 16 and the second nitrogen oxides detection part 17.

Moreover, according to this embodiment, the engine device 1 further comprises the control device 19 controlling the operation of the first path switch valve 9, and the temperature detection part 18 detecting the temperature of the exhaust gas and/or the temperature of the ammonia adsorption catalyst 7, wherein the control device 19 calculates or estimates the amount of ammonia adsorbed in the ammonia adsorption catalyst 7 based on the detection results from the first ammonia detection part 14, the first nitrogen oxides detection part 15 and the temperature detection part 18, and controls the operation of the first path switch valve 9 based on the amount of adsorbed ammonia.

Because of this, the engine device 1 can decide and selectively switch a path through which the exhaust gas is flowed in consideration of the amount of ammonia adsorbed in the ammonia adsorption catalyst 7.

Moreover, according to this embodiment, in a case where the ratio of ammonia is higher than the ratio of nitrogen oxides in the exhaust gas, or in a case where the ratio of nitrogen oxides is higher than the ratio of ammonia in the exhaust gas, and the amount of ammonia adsorbed in the ammonia adsorption catalyst 7 is higher than a predetermined threshold of the amount adsorbed, the engine device 1 passes and exhausts the exhaust gas through the ammonia adsorption catalyst 7 and the selective reduction catalyst 6. Further, in a case where the ratio of nitrogen oxides is higher than the ratio of ammonia in the exhaust gas, and the amount of ammonia adsorbed in the ammonia adsorption catalyst 7 is less than a predetermined threshold of the amount adsorbed, the engine device 1 passes and exhausts the exhaust gas through the selective reduction catalyst without being passed through the ammonia adsorption catalyst 7. Moreover, regardless of the ratio of nitrogen oxides and the ratio of ammonia in the exhaust gas, in a case where abnormalities occur to the operational state of the engine 2 or the selective reduction catalyst 6, the engine device 1 exhausts the exhaust gas without being passed through the ammonia adsorption catalyst 7 and the selective reduction catalyst 6.

In this way, the engine device 1 can further appropriately decide and selectively switch a path through which the exhaust gas is flowed in consideration of the ratio of ammonia and the ratio of nitrogen oxides in the exhaust gas, and the amount of ammonia adsorbed in the ammonia adsorption catalyst 7.

Meanwhile, while in FIG. 1, an example that the first path switch valve 9 is provided in the exhaust passage 4 on the lower stream side of the exhaust direction than the branch point of the exhaust passage 4 and the inlet of the first bypass passage 8 has been shown, the present invention is not limited to this example; alternatively, the first path switch valve 9 may be provided at the branch point of the exhaust passage 4 and the inlet of the first bypass passage 8.

Further, although in FIG. 1, an example that the second bypass passage 10 is connected to the first bypass passage 8 on the lower stream side of the exhaust direction than the branch point of the exhaust passage 4 and the inlet of the first bypass passage 8 has been shown, the present invention is not limited to this example; the second bypass passage 10 may be connected to the exhaust passage 4 at the branch point of the exhaust passage 4 and the inlet of the first bypass passage 8, or alternatively, may be connected to the exhaust passage 4 on the upper stream side of the exhaust direction than the branch point of the exhaust passage 4 and the inlet of the first bypass passage 8.

Also, while in FIG. 1, an example that the second path switch valve 11 is provided in the first bypass passage 8 on the lower stream side of the exhaust direction than the branch point of the inlets of the first bypass passage 8 and the second bypass passage 10 has been shown, the present invention is not limited to this example; alternatively, the second path switch valve 11 may be provided at the branch point of the inlets of the first bypass passage 8 and the second bypass passage 10. In this case, the second path switch valve 11 may have a structure that inhibits the frow of the exhaust gas from entering the first bypass passage 8 and the second bypass passage 10, and selects into which of the first and second bypass passages 8 and 10 the exhaust gas is flowed, and in this structure, the third path switch valve 12 can be omitted.

Meanwhile, in the above embodiment, in order to decide whether the exhaust gas is flowed through the ammonia adsorption catalyst 7 and the selective reduction catalyst 6 or not, an example that the control device 19 acquires the ratio (for example, the concentration or the number of moles) of ammonia and nitrogen oxides exhausted from the engine 2 based on the detection results from the first ammonia detection part 14 and detection results from the first nitrogen oxides detection part 15; however, the present invention is not limited to this example.

In another example, the engine device 1 detects or measures the ratio (proportion) and the amount of emissions of ammonia and nitrogen oxides exhausted when the engine 2 is operated under various operational conditions (such as engine speed and load), and the control device 19 previously stores data in which each operational condition is associated with the ratio and/or amount of emissions of ammonia and nitrogen oxides in accordance with each operational condition as exhaust gas information. Meanwhile, the engine device 1 may acquire exhaust gas information by a pilot operation of the engine 2 and/or may acquire and store exhaust gas information when the engine 2 is actually operated. And the control device 19 acquires the operational conditions when the engine 2 is operated, and based on the operational condition of interest and previously stored exhaust gas information, acquires ratio data (proportional data) and/or data on the amount of emissions of ammonia and nitrogen oxides corresponding to the operational condition of interest.

In this case, similarly to the above embodiment, the control device 19 controls, based on acquired ratio data and/or data on amount of emissions of ammonia and nitrogen oxides, the operation of the first path switch valve 9, and preferably, controls the operation of the second path switch valve 11 and the third path switch valve 12 in addition to the first path switch valve 9 to control the flow of the exhaust gas.

For this reason, when the engine device 1 previously stores exhaust gas information indicating the relationship between the operational conditions of the engine 2 and the ratio and/or amount of emissions of ammonia and nitrogen oxides in the exhaust gas, the first ammonia detection part 14 and the first nitrogen oxides detection part 15 are not required, allowing the structure to be simplified.

Further, although in the above embodiment, an example that in order to decide whether the exhaust gas is flowed through the ammonia adsorption catalyst 7 and the selective reduction catalyst 6 or not, the control device 19 calculates the amount of ammonia adsorbed in the ammonia adsorption catalyst 7 based on the temperature of the exhaust gas or the temperature of the ammonia adsorption catalyst 7 detected at the temperature detection part 18, the concentration of ammonia detected at the first ammonia detection part 14 and the concentration of nitrogen oxides detected at the first nitrogen oxides detection part 15 has been explained, the present invention is not limited to this example.

In another example, the control device 19 acquires, based on previously stored exhaust gas information, ratio data (proportion data) and/or amount of emissions data of ammonia and nitrogen oxides corresponding to operational conditions when the engine 2 is operated, and computes the concentration of ammonia and the concentration of nitrogen oxides based on acquired ratio data and/or amount of emissions data of ammonia and nitrogen oxides. Then, the control device 19 computes, based on the temperature of the exhaust gas or the temperature of the ammonia adsorption catalyst 7 detected at the temperature detection part 18 and the concentration of ammonia and the concentration of nitrogen oxides computed based on exhaust gas information, the amount of ammonia adsorbed in the ammonia adsorption catalyst 7.

In this case, as in the above embodiment, in addition to the ratio of ammonia and the ratio of nitrogen oxides computed based on exhaust gas information, and based on the amount of ammonia adsorbed in the ammonia adsorption catalyst 7 computed based on exhaust gas information, the control device 19 controls the operation of the first path switch valve 9, and preferably, controls, in addition to the first path switch valve 9, the operation of the second path switch valve 11 and the third path switch valve 12 to control the flow of the exhaust gas.

Therefore, by utilizing exhaust gas information, the engine device 1 can not only dispense with the first ammonia detection part 14 and the first nitrogen oxides detection part 15 to make the structure simplified, but also compute the amount of ammonia adsorbed in the ammonia adsorption catalyst 7, and can appropriately decide and selectively switch a path through which the exhaust gas is flowed based on that amount of ammonia adsorbed.

In addition, in the above embodiment, although an example that in a case where the ratio of nitrogen oxides is higher than the ratio of ammonia in the exhaust gas, the control device 19 switches the path to the main exhaust path 101 when the amount of ammonia adsorbed in the ammonia adsorption catalyst 7 is more than a predetermined threshold of the amount adsorbed while it switches the path to the first bypass path 102 when the amount of ammonia adsorbed in the ammonia adsorption catalyst 7 is less than a predetermined threshold of the amount adsorbed has been explained, the present invention is not limited to this example.

In another example, in a case where the ratio of nitrogen oxides is higher than the ratio of ammonia in the exhaust gas, the control device 19 may decide the amount of ammonia adsorbed in the ammonia adsorption catalyst 7 with several stages of thresholds and switch a path through which the exhaust gas is flowed in a stage-by-stage manner. For example, in a case where a first threshold of the amount adsorbed and a second threshold of the amount adsorbed less than the first threshold of the amount adsorbed are previously set, when the amount of ammonia adsorbed is more than the first threshold of the amount adsorbed, the control device 19 may switch the path to the main exhaust path 101, when the amount of ammonia adsorbed is at the first threshold of the amount adsorbed or lower and more than the second threshold of the amount adsorbed, it may switch the path to both the main exhaust path 101 and the first bypass path 102 so as to flow the exhaust gas, and when the amount of ammonia adsorbed is at the second threshold of the amount adsorbed or lower, it may switch the path to the first bypass path 102. Meanwhile, when both the main exhaust path 101 and the first bypass path 102 are utilized, the control device 19 may regulate the flow rate of the main exhaust path 101 and the first bypass path 102 by means of the first path switch valve 9 and the second path switch valve 11 so as not to produce a pressure loss.

Meanwhile, the present invention can be appropriately modified in a range not contrary to an abstract or concept of the present invention which can be read throughout claims and the specification, and an engine device with such modifications is also included in the technical concept of the present invention.

SUPPLEMENTARY NOTES OF THE INVENTION

In the following, an outline of the invention extracted from the aforementioned embodiment will be supplementarily described. Meanwhile, each structure and each processing function described in the following supplementary notes can be selected and arbitrarily combined.

Supplementary Note 1

An engine device comprising an engine which is operated by a fuel containing at least ammonia, the engine device comprising:

an exhaust passage through which an exhaust gas exhausted from the engine is flowed in an exhaust direction;

in the exhaust passage, a selective reduction catalyst which reduces nitrogen oxides contained in the exhaust gas by a reducing agent;

in the exhaust passage on an upper stream side than the selective reduction catalyst in the exhaust direction, an ammonia adsorption catalyst which adsorbs ammonia contained in the exhaust gas;

a first bypass passage connected to the exhaust passage to bypass the ammonia adsorption catalyst; and a first path switch valve which switches whether a flow of the exhaust gas is to pass through the ammonia adsorption catalyst or not.

Supplementary Note 2

The engine device according to supplementary note 1, wherein the first path switch valve is provided on an upper stream side than the ammonia adsorption catalyst in the exhaust direction.

Supplementary Note 3

The engine device according to supplementary note 1, further comprising:

a second bypass passage connected to the exhaust passage to bypass the ammonia adsorption catalyst and the selective reduction catalyst; and a second path switch valve which switches whether the flow of the exhaust gas is to pass through the selective reduction catalyst or not.

Supplementary Note 4

The engine device according to supplementary note 3, wherein the second path switch valve is provided on the upper stream side than the selective reduction catalyst in the exhaust direction.

Supplementary Note 5

The engine device according to any one of supplementary notes 1-4, further comprising: provided in the exhaust passage on the upper stream side than the ammonia adsorption catalyst in the exhaust direction, a first ammonia detection part which detects ammonia contained in the exhaust gas; and a first nitrogen oxides detection part which detects nitrogen oxides contained in the exhaust gas, wherein an operation of the first path switch valve is controlled based on detection results from the first ammonia detection part and the first nitrogen oxides detection part.

Supplementary Note 6

The engine device according to supplementary note 5, further comprising: in the exhaust passage on a lower stream side than the ammonia adsorption catalyst, and on the upper stream side than the selective reduction catalyst in the exhaust direction, a second ammonia detection part which detects ammonia contained in the exhaust gas; and a second nitrogen oxides detection part which detects nitrogen oxides contained in the exhaust gas.

Supplementary Note 7

The engine device according to any one of supplementary notes 1-6, further comprising a control device which controls an operation of the first path switch valve, wherein the control device controls the operation of the first path switch valve based on proportion data and/or amount of emissions data of ammonia and nitrogen oxides contained in the exhaust gas in operational conditions of the engine.

Supplementary Note 8

The engine device according to supplementary note 5 or 6, further comprising: a control device which controls an operation of the first path switch valve; and a temperature detection part which detects a temperature of the exhaust gas or a temperature of the ammonia adsorption catalyst, wherein the control device calculates or estimates an amount of ammonia adsorbed in the ammonia adsorption catalyst based on detection results from the first ammonia detection part, the first nitrogen oxides detection part and the temperature detection part, and controls an operation of the first path switch valve based on the amount of ammonia adsorbed.

Supplementary Note 9

The engine device according to supplementary note 7, further comprising: a temperature detection part which detects a temperature of the exhaust gas or a temperature of the ammonia adsorption catalyst, wherein the control device calculates or estimates an amount of ammonia adsorbed in the ammonia adsorption catalyst based on the proportion data and/or the amount of emissions data and detection results from the temperature detection part, and controls an operation of the first path switch valve based on the amount of ammonia adsorbed.

Supplementary Note 10

The engine device according to any one of supplementary notes 1-9, wherein when a ratio of ammonia is higher than a ratio of nitrogen oxides in the exhaust gas, or when a ratio of nitrogen oxides is higher than a ratio of ammonia in the exhaust gas, and the amount of ammonia adsorbed in the ammonia adsorption catalyst is more than a predetermined threshold of amount adsorbed, the exhaust gas is passed and exhausted through the ammonia adsorption catalyst and the selective reduction catalyst, and when the ratio of nitrogen oxides is higher than the ratio of ammonia in the exhaust gas, and the amount of ammonia adsorbed in the ammonia adsorption catalyst is less than a predetermined threshold of amount adsorbed, the exhaust gas is passed and exhausted through the selective reduction catalyst without being passed through the ammonia adsorption catalyst.

Supplementary Note 11

The engine device according to any one of supplementary notes 1-10, wherein regardless of the ratio of nitrogen oxides and the ratio of ammonia in the exhaust gas, in a case where abnormalities occur to an operational state of the engine or the selective reduction catalyst, the exhaust gas is exhausted without being passed through the ammonia adsorption catalyst and the selective reduction catalyst.

REFERENCE SIGNS LIST

1 engine device
2 engine 3 intake passage
4 exhaust passage
6 selective reduction catalyst
6*a* reducing agent supply part
7 ammonia adsorption catalyst
8 first bypass passage
9 first path switch valve
10 second bypass passage
11 second path switch valve
12 third path switch valve
14 first ammonia detection part
15 first nitrogen oxides detection part
16 second ammonia detection part
17 second nitrogen oxides detection part
18 temperature detection part
19 control device
20 cylinder block
21 cylinder
21*a* combustion chamber
22 crankcase
23 cylinder body
24 piston
25 cylinder head
26 ignition device
27 crankshaft
28 connecting rod
29 intake port
30 exhaust port
31 intake valve
32 exhaust valve
33 intake manifold
33*a* branch channel
34 exhaust manifold
34*a* branch channel
35 ammonia tank
36 fuel supply part
101 main exhaust path
102 first bypass path
103 second bypass path

The invention claimed is:

1. An engine device comprising an engine which is operated by a fuel containing at least ammonia, the engine device comprising:

an exhaust passage through which an exhaust gas exhausted from the engine is flowed in an exhaust direction;

in the exhaust passage, a selective reduction catalyst which reduces nitrogen oxides contained in the exhaust gas by a reducing agent;

in the exhaust passage on an upper stream side than the selective reduction catalyst in the exhaust direction, an ammonia adsorption catalyst which adsorbs ammonia contained in the exhaust gas;

a first bypass passage connected to the exhaust passage to bypass the ammonia adsorption catalyst;

a first path switch valve which switches whether a flow of the exhaust gas is to pass through or around the ammonia adsorption catalyst;

a second bypass passage connected to the exhaust passage to bypass the ammonia adsorption catalyst and the selective reduction catalyst; and a second path switch valve which switches whether the flow of the exhaust gas is to pass through or around the selective reduction catalyst.

2. The engine device according to claim 1, wherein the first path switch valve is provided on an upper stream side than the ammonia adsorption catalyst in the exhaust direction.

3. The engine device according to claim 1, wherein the second path switch valve is provided on an upper stream side than the selective reduction catalyst in the exhaust direction.

4. The engine device according to claim 1, further comprising: in the exhaust passage on an upper stream side than the ammonia adsorption catalyst in the exhaust direction, a first ammonia detection part which detects ammonia contained in the exhaust gas; and a first nitrogen oxides detection part which detects nitrogen oxides contained in the exhaust gas, wherein an operation of the first path switch valve is controlled based on detection results from the first ammonia detection part and the first nitrogen oxides detection part.

5. The engine device according to claim 4, further comprising: in the exhaust passage on a lower stream side than the ammonia adsorption catalyst, and on the upper stream side than the selective reduction catalyst in the exhaust direction, a second ammonia detection part which detects ammonia contained in the exhaust gas and a second nitrogen oxides detection part which detects nitrogen oxides contained in the exhaust gas.

6. The engine device according to claim 1, further comprising a control device which controls an operation of the first path switch valve, wherein the control device controls the operation of the first path switch valve based on proportion data and/or amount of emissions data of ammonia and nitrogen oxides contained in the exhaust gas in operational conditions of the engine.

7. The engine device according to claim 4, further comprising: a control device which controls an operation of the first path switch valve; and a temperature detection part which detects a temperature of the exhaust gas or a temperature of the ammonia adsorption catalyst, wherein the control device calculates or estimates an amount of ammonia adsorbed in the ammonia adsorption catalyst based on detection results from the first ammonia detection part, the first nitrogen oxides detection part and the temperature detection part, and controls an operation of the first path switch valve based on the amount of ammonia adsorbed.

8. The engine device according to claim 6, further comprising: a temperature detection part which detects a temperature of the exhaust gas or a temperature of the ammonia adsorption catalyst, wherein the control device calculates or estimates an amount of ammonia adsorbed in the ammonia adsorption catalyst based on the proportion data and/or the amount of emissions data and detection results from the temperature detection part, and controls an operation of the first path switch valve based on the amount of ammonia adsorbed.

9. The engine device according to claim 1, wherein when a ratio of ammonia is higher than a ratio of nitrogen oxides in the exhaust gas, or when a ratio of nitrogen oxides is higher than a ratio of ammonia in the exhaust gas, and the amount of ammonia adsorbed in the ammonia adsorption catalyst is more than a predetermined threshold of amount adsorbed, the exhaust gas is passed and exhausted through the ammonia adsorption catalyst and the selective reduction catalyst, and when the ratio of nitrogen oxides is higher than the ratio of ammonia in the exhaust gas and the amount of ammonia adsorbed in the ammonia adsorption catalyst is less than the predetermined threshold of amount adsorbed, the exhaust gas is passed and exhausted through the selective reduction catalyst without being passed through the ammonia adsorption catalyst.

10. The engine device according to claim 1, wherein regardless of a ratio of nitrogen oxides and a ratio of ammonia in the exhaust gas, in a case where abnormalities occur to an operational state of the engine or the selective reduction catalyst, the exhaust gas is exhausted without being passed through the ammonia adsorption catalyst and the selective reduction catalyst.

* * * * *